United States Patent
Modica

(10) Patent No.: US 6,882,531 B2
(45) Date of Patent: Apr. 19, 2005

(54) METHOD AND RACK FOR EXCHANGING AIR WITH MODULAR BRICKS IN A COMPUTER SYSTEM

(75) Inventor: Steve Modica, Inver Grove Heights, MN (US)

(73) Assignee: Silicon Graphics, Inc., Mountain View, CA (US)

( * ) Notice: Subject to any disclaimer, the term of this patent is extended or adjusted under 35 U.S.C. 154(b) by 292 days.

(21) Appl. No.: 10/201,230

(22) Filed: Jul. 23, 2002

(65) Prior Publication Data

US 2004/0017655 A1 Jan. 29, 2004

(51) Int. Cl.[7] ................................................. G06F 1/20
(52) U.S. Cl. ....................... 361/687; 361/695; 454/184; 165/80.3; 415/177; 174/35 R
(58) Field of Search ................. 361/687, 683, 361/724–727, 690–695; 312/223.1, 223.2, 223.5, 265.5; 454/184, 252, 906; 165/80.3, 120, 126, 104.34, 104.33; 415/213.1, 178, 177, 214.1; 174/35 R, 52.1

(56) References Cited

U.S. PATENT DOCUMENTS

| | | | | |
|---|---|---|---|---|
| 3,902,404 A | * | 9/1975 | Breit .............................. 92/86 |
| 5,136,464 A | * | 8/1992 | Ohmori ....................... 361/694 |
| 5,570,740 A | * | 11/1996 | Flores et al. ........... 165/104.34 |
| 5,832,988 A | * | 11/1998 | Mistry et al. .......... 165/104.34 |
| 6,101,459 A | * | 8/2000 | Tavallaei et al. ............ 702/132 |
| 6,185,098 B1 | * | 2/2001 | Benavides ................... 361/695 |
| 6,351,381 B1 | * | 2/2002 | Bilski et al. ................. 361/695 |
| 6,535,382 B1 | * | 3/2003 | Bishop et al. .............. 361/690 |
| 6,598,668 B1 | * | 7/2003 | Cosley et al. .......... 165/104.32 |
| 6,628,520 B1 | * | 9/2003 | Patel et al. .................. 361/696 |

* cited by examiner

*Primary Examiner*—Lisa Lea-Edmonds
(74) *Attorney, Agent, or Firm*—Schwegman, Lundberg, Woessner & Kluth, P.A.

(57) ABSTRACT

A modular computing system that includes an enclosure and a rack at least partially mounted within the enclosure. The modular computing system further includes a plurality of modular bricks that each include electronic components. The modular bricks are mounted in the rack and connected to the conduits in the rack. A fan is also connected to the conduits in the rack such that the rack exchanges air between the fan and each modular brick to cool the electronic components in each of the modular bricks.

20 Claims, 2 Drawing Sheets

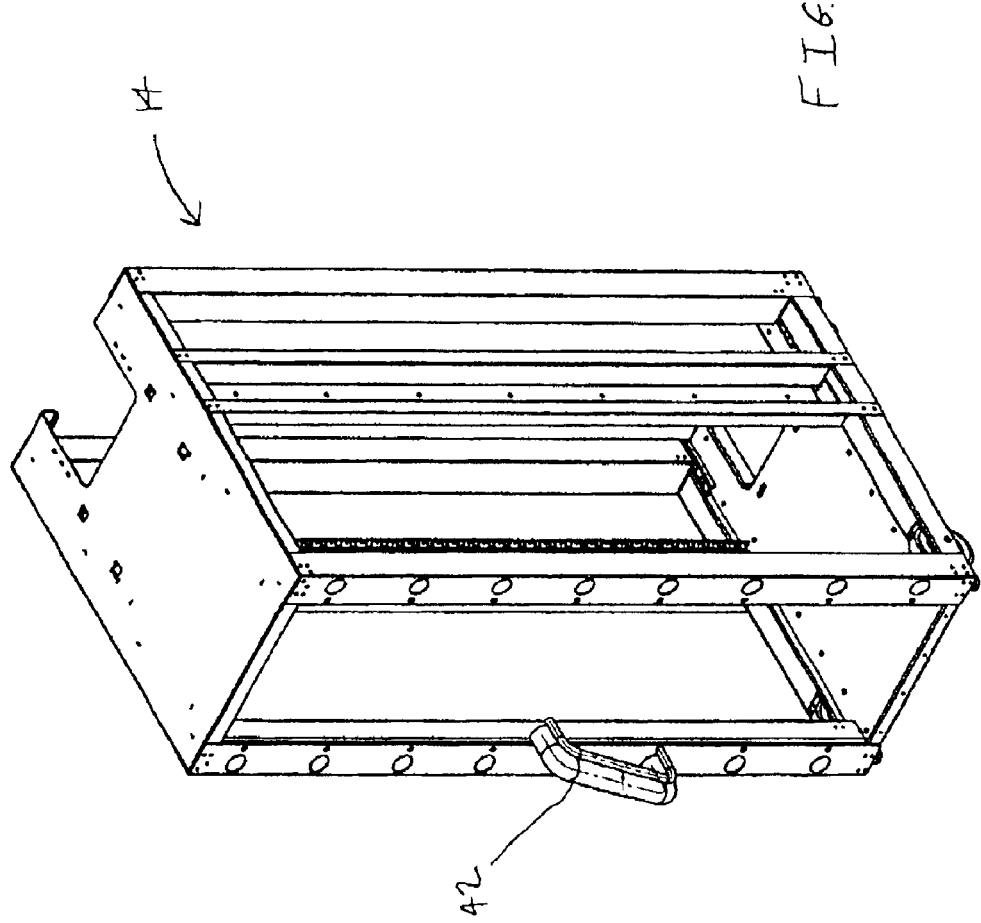

METHOD AND RACK FOR EXCHANGING AIR WITH MODULAR BRICKS IN A COMPUTER SYSTEM

FIELD OF THE INVENTION

The present invention is related to computer system cooling, and more particularly to a method and rack for exchanging air with modular bricks in a computer system.

BACKGROUND OF THE INVENTION

Modern computer systems typically generate a great deal of heat in a very small space. Some computer systems use air cooling techniques to draw heat away from critical components in the computer system. Air cooling is used on computers ranging from personal computers and laptops to minicomputer and mainframe systems. Air cooling systems typically use fans, or some other air moving device, to move air across electrical components in the computer system.

In conventional computer systems, fans are mounted inside of the system being cooled in order to either suck air from, or force air into, the computer system. Computer systems are continually being developed that pack more devices in smaller spaces such that there is a great deal of heat generated per unit volume. The cooling systems in such systems typically need to exchange large volumes of air to ensure that an adequate amount of heat is removed from the system. Failure to exchange adequate amounts of air can cause overheating that results in system error or failure.

Some computer systems are modular in that they are formed of one or more bricks that fit into a rack. Each brick typically contains its own electronics and fans to cool the electronics. The fans occupy valuable space within each brick that may otherwise be taken up by heat sinks and/or additional electronics. In addition, since the fans are positioned within each brick maintenance and/or replacement of a failed fan must typically be performed by qualified technicians because of potential physical and electrical dangers. The fans within each brick are also powered by currents that generate unwanted electromagnetic interference within the brick.

Thus, what is needed is a computer system and method for efficiently exchanging air with modular bricks in a brick-based computer system. The computer system and method should reduce downtime due to fan failure while at the same time exchanging adequate amounts of air through each modular brick. It would also be desirable if such a system and method utilized no space within each brick and permitted fan replacement by non-technical workers while the electronics system was running.

SUMMARY OF THE INVENTION

A method and rack for exchanging air with modular bricks in a brick-based computer system. The rack supports multiple modular bricks and directs air into one or more of the modular bricks that form the computing system. The rack minimizes the need to use flexible conduit to transfer air to the modular bricks that require cooling.

Reducing the amount of flexible conduit in a computer system is desirable because the individual conduits tend to become tangled, kinked and/or torn. The flexible conduit is also difficult to install and/or rearrange, especially when air is supplied to multiple modular bricks from multiple sources.

The rack also simplifies cable management within a computing system and allows designers to place fans, or some other air moving device, outside of the modular bricks that include electronic components. Removing the fans from the modular bricks that include electronic components permits easy access to the fans for replacement by non-technical workers. In addition, placing the fans in a separate modular brick (i) allows electrical designers to locate additional electronics and/or heat sinks within the other modular bricks that include electronic components; and (ii) removes the electromagnetic interference, which is generated by the current that powers the fans, from the bricks that include electronic components.

One aspect provides a modular computing system that includes an enclosure, a rack inside the enclosure and a modular brick that includes electronic components. The rack supports the modular brick and exchanges air with the modular brick to cool the electronic components in the modular brick.

Another aspect provides a method for exchanging air with modular bricks in a computer system. The method includes placing a modular brick that includes electronic components into a rack inside an enclosure, and using the rack to exchange air with the modular brick to cool the electronic components in the modular brick.

Still another aspect provides a modular computing system that includes an enclosure and a rack at least partially mounted within the enclosure. The modular computing system further includes a plurality of modular bricks that each include electronic components. The modular bricks are mounted in the rack and connected to the conduits in the rack. A fan is also connected to the conduits in the rack such that the rack exchanges air between the fan and each modular brick to cool the electronic components in each of the modular bricks.

BRIEF DESCRIPTION OF THE DRAWINGS

FIG. 2 shows an example rack that may be used in the modular computing system of FIG. 1.

DETAILED DESCRIPTION

Figure 1:
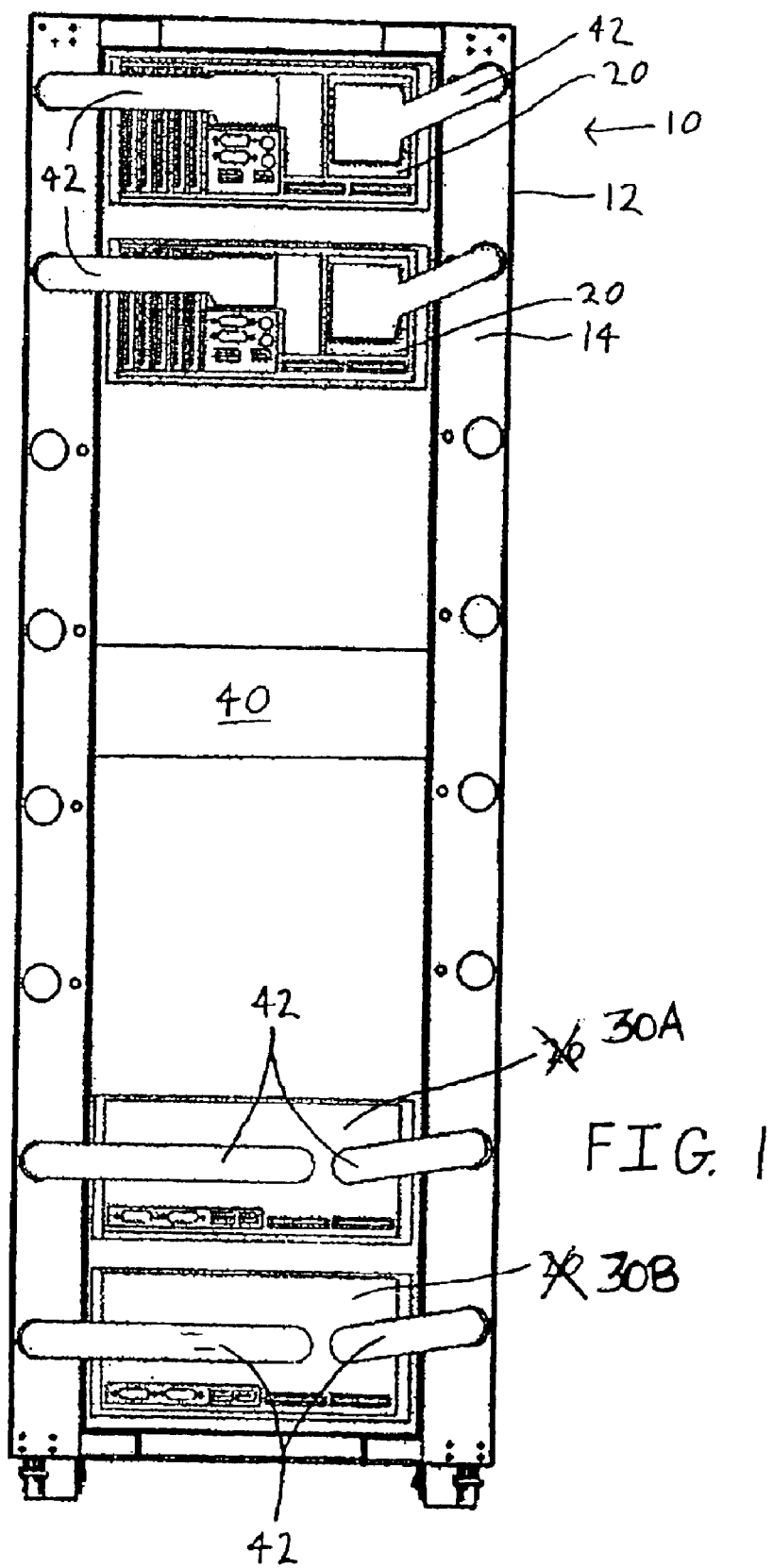
FIG. 1 shows a modular computing system.

In the following detailed description reference is made to the accompanying drawings that show by way of illustration specific embodiments. It is understood that other embodiments may be utilized and structural changes made.

FIG. 1 shows a modular computing system 10 that includes an enclosure 12 and a rack 14 that is partly, or wholly, mounted inside enclosure 12. Computing system 10 further includes one or more modular bricks 20 that are mounted in rack 14. Rack 14 exchanges air with one or more of the modular bricks 20 to cool the electronic components in the modular bricks 20. As used herein, a brick is any stand-alone device that includes one component of system 10. Bricks may have, but are not required to have, their own power source.

Computing system 10 may further include a plurality of fans 30A, 30B connected to rack 14. Fans 30A, 30B force air exchange between rack 14 and one or more of the modular bricks 20. Depending on the arrangement of the fans 30A, 30B, air is either forced into modular bricks 20 from rack 14, or drawn air into rack 14 from modular bricks 20, to cool the electronic components in the modular bricks 20. As used herein, a fan is any device that moves air, including a blower, impeller among others.

Referring now also to FIG. 2, rack 14 may include one more conduits 42 that connect modular bricks 20 to the fans such that air, or some other fluid, is exchanged through rack 14 between modular bricks 20 and the fans 30A, 30B. In the sample embodiment illustrated in FIG. 2, only one conduit 42 is shown. As used herein, a conduit is a hollow enclosure of any shape that is external to the bricks in the computing system and is designed to guide air.

Rack 14 simplifies cable management within computing system 10 because conduits, or some other equivalent for exchanging air with modular bricks 20, is incorporated right into rack 14. Rack 14 may also include ties, holders and other cable management devices to help organize the mass of electrical cables that can be part of a computing system.

In some embodiments, system 10 includes a controller 40 to detect when there is a malfunction with any of the fans 30A, 30B, such as when some, all or one of the fans 30A, 30B, becomes damaged or inoperative. In alternative embodiments, system 10 includes a primary fan 30A that exchanges air between rack 14 and one or more of the modular bricks 20. A backup fan 30B is connected to rack 14 such that the backup fan 30B exchanges air with one or more of the modular bricks 20 to cool the electronic components in modular bricks 20 when controller 40 detects a malfunction in the primary fan 30A.

Depending on the amount of air movement required for particular applications, the number and arrangement of the fans 30A, 30B will vary based on such factors as (i) the size of the fans 30A, 30B; (ii) the number of modular bricks 20; (iii) the heat generated by each brick 20; and (iv) the ambient environment where computing system 10 is located. Other factors will be apparent to those of ordinary skill in the art.

In the illustrated embodiment, each of the modular bricks 20 is the same size to promote the modular nature of the brick-based computing system 10. In alternative embodiments, the bricks may be different sizes with each brick being sized relative to a common unit, such as one-quarter size, one-half size etc.

A method for exchanging air with modular bricks in a computer system is also illustrated in FIGS. 1 and 2. The method includes at least partially placing one or more modular bricks 20 that include electronic components into a rack 14 inside an enclosure 12, and using rack 14 to exchange air with modular bricks 20 to cool the electronic components in modular bricks 20. The method may include securing one or more conduits 42 on rack 14 to one or more of the modular bricks 20.

In some embodiments, using rack 14 to exchange air with modular bricks 20 includes forcing air from modular bricks 20 into rack 14, while in other embodiments using rack 14 to exchange air with modular bricks 20 includes forcing air from rack 14 into modular bricks 20.

In an example embodiment, using rack 14 to exchange air with modular bricks 20 includes connecting rack 14 to a primary fan 30A or fans 30A, 30B inside enclosure 12, and may further include connecting rack 14 to a secondary fan 30B inside enclosure 12 that exchanges air with modular bricks 20 when there is a malfunction with the primary fan 30A.

It is understood that the above description is intended to be illustrative, and not restrictive. Many other embodiments will be apparent to those of skill in the art upon reviewing the above description.

What is claimed is:

1. A method for exchanging air with modular bricks in a computer system, comprising;
   placing a modular brick into a rack inside an enclosure, the modular brick including electronic components; and
   using the rack to exchange air with the modular brick to cool the electronic components in the modular brick.

2. The method according to claim 1, wherein placing a modular brick into a rack includes securing a conduit on the rack to the modular brick.

3. The method according to claim 1, wherein using the rack exchange air with the modular brick includes forcing air from the modular brick into the rack.

4. The method according to claim 1, wherein using the rack exchange air with the modular brick includes forcing air from the rack into the modular brick.

5. The method according to claim 1, wherein using the rack to exchange air with the modular brick includes connecting the rack to a primary fan.

6. The method according to claim 5, wherein placing a modular brick into a rack includes at least partially placing the modular brick into an enclosure.

7. The method according to claim 6, wherein connecting the rack to a primary fan includes connecting the rack to the primary fan inside the enclosure.

8. The method according to claim 5, wherein using the rack to exchange air with the modular brick further includes connecting the rack to a secondary fan that exchanges air with the modular brick when there is a malfunction with the primary fan.

9. The method according to claim 5, further comprising placing at least one additional modular brick that includes electronic components into the rack within the computer system; and wherein using the rack to exchange air with the modular brick includes using the rack to exchange air with each modular brick to cool the electronic components in each modular brick.

10. A modular computing system, comprising:
    a modular brick that includes electronic components;
    an enclosure; and
    a rack inside the enclosure, the rack supporting the modular brick and exchanging air with the modular brick to cool the electronic components in the brick.

11. The modular computing system of claim 10, further comprising at least one additional modular brick that includes electronic components, the rack exchanging air with each of the modular bricks to cool the electronic components in each brick.

12. The modular computing system of claim 11, wherein each of the modular bricks are the same size.

13. The modular computing system of claim 11, further comprising a primary fan connected to the rack, the fan forcing air exchange between the rack and the modular brick.

14. The modular computing system of claim 13, wherein the primary fan forces air from the rack into the modular brick.

15. The modular computing system of claim 13, wherein the primary fan forces air from the modular brick into the rack.

16. The modular computing system of claim 13, further comprising a controller that detects when there is a malfunction in the primary fan.

17. The modular computing system of claim 16, further comprising a backup fan connected to the rack such that the backup fan exchanges air with the modular brick to cool the electronic components in the modular brick when the controller detects a malfunction in the primary fan.

18. The modular computing system of claim 10 wherein the rack includes at least one conduit that is connected to the modular brick.

19. The modular computing system of claim 10 wherein the rack is partially mounted within the enclosure. brick to cool the electronic components in each of the modular bricks.

20. A modular computing system, comprising:
    an enclosure;
    a rack at least partially mounted within the enclosure, the rack including conduits;
    a plurality of modular bricks mounted in the rack and connected to one or more of the conduits in the rack, each modular brick including electronic components; and
    a fan connected to the conduits in the rack such that the rack exchanges air between the fan and each modular

* * * * *